3,255,155
GEL PREVENTION IN POLYMERIC ADDITIVES
FOR HYDROCARBON OILS
Joel R. Siegel, Irvington, and Hugh H. Horowitz, Elizabeth, N.J., assignors to Esso Research and Engineering Company, a corporation of Delaware
No Drawing. Filed May 15, 1961, Ser. No. 109,878
2 Claims. (Cl. 260—78.5)

This invention relates to improvements in the art of manufacturing polymeric additives for mineral oils, and especially for the higher boiling hydrocarbon oils in the general classification of middle distillate fuels and lubricating oils. The invention is particularly directed to the prevention of cross-linking in polymers that contain carboxyl and hydroxyl groups. Such cross-linking is undesirable because it causes gel formation and reduces oil solubility.

High molecular weight polymers and copolymers comprising esters of dicarboxylic acids including maleates, fumarates, itaconates and the like have been used in the past as additives for lowering the pour point, raising the viscosity index and improving the sludge dispersing properties of heating oils and lubricating oils. In those cases where the polymers contain both carboxyl groups and hydroxyl groups they tend to gel as a result of cross-linking reactions between the hydroxyl and carboxyl groups. This gelation occurs during the polymerization reaction and thus prevents the polymerization from being carried to completion. The cross-linking may be envisioned as follows:

(1)

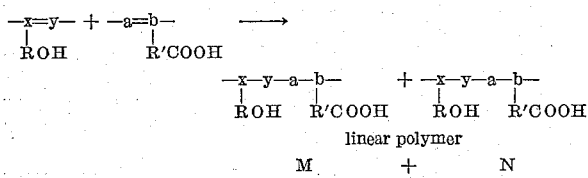

(2) Secondary condensation step:

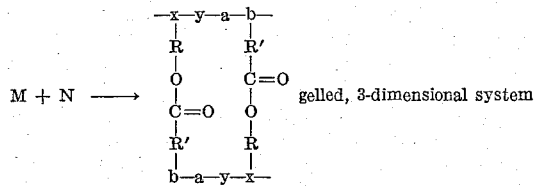

R and R' represent organic groups. It is difficult to reduce to zero, by esterification, the total acid number of monomers containing ester groups. As a result, oil-soluble polymers of high molecular weight containing such monomers and hydroxylic monomers cannot be made. This is true because of the secondary reaction described above.

This situation can be remedied in accordance with the present invention by treating the esterified monomer or a solution thereof in such a solvent as ether or hexane, for example, with anhydrous ammonia or with an ammonia derivative, i.e., an alkyl amine, an aryl amine, or a quaternary ammonium hydroxide. The excess base and solvent are removed by nitrogen blowing and heating or by vacuum stripping. The polymerization is then carried out in the usual manner.

As a result:

(1) Linear oil-soluble polymers can be made where, before volatile base treating, only cross-linked, oil insoluble products formed. (In most instances, there is no obvious viscosity increase in these reactions without ammonia treat, and in those instances where there is some viscosity increase only partial polymerization of monomers occurs, with the major fraction of the monomer remaining unconverted.)

(2) In cases where linear polymers form, polymers of higher viscosity can be made where prior to the present invention viscosity was limited by gel formation.

The invention is particularly applicable to polymers made from monomers of alkoxy esters of unsaturated dibasic acids or from monomers of alkyl chloropropyleneoxy esters of unsaturated dibasic acids. The alkoxy esters referred to are derived from unsaturated dibasic acids which are first partially esterified with an aliphatic alcohol and then further reacted with an alkylene oxide. The alkyl chloropropyleneoxy esters referred to may be obtained by first reacting an unsaturated dibasic acid with an aliphatic alcohol to form a half ester and then further reacting the half ester with epichlorohydrin in the presence of an acidic catalyst. Suitable unsaturated dibasic acids that can be used for preparing either of the types of esters involved in this invention include maleic acid ($C_4$), fumaric acid ($C_4$), citraconic acid ($C_5$), mesaconic acid ($C_5$), and itaconic acid ($C_5$). The preferred acids are the butenedioic acids, i.e., maleic and fumaric acids.

When preparing the alkoxy esters, the unsaturated dibasic acid is partly esterified with any aliphatic alcohol, although such alcohols having from 3 to 20 carbon atoms per molecule are preferred, and those having from 9 to 18 carbon atoms per molecule are particularly preferred. The alcohols may be of straight-chain or branched configuration, and those alcohols produced by the "Oxo" process are preferred. It is within the scope of the invention to use a mixture of such alcohols. By the term "partly esterified" is meant that less than two gram molecules of alcohol is reacted with a gram molecule of organic dibasic acid during the esterification process. Particularly useful proportions of reactants include 1 gram molecule of dibasic acid with from about 1 to about 1.5 gram molecules of alcohol. The product is probably a mixture of diesters and half esters and some unesterified acid.

The partly esterified dibasic acid is reacted with any alkylene oxide to produce the alkoxy ester compounds. The alkylene oxide used is preferably one which contains from 2 to 6 carbon atoms per molecule, and most preferably is ethylene oxide or propylene oxide. It is within the scope of the present invention that the partly esterified acid may have some residual free acid hydrogen atoms left after reaction with the alkylene oxide, or it may be neutral, all the residual free acid hydrogen being reacted with the alkylene oxide. The reaction of the partially esterified acid with the alkylene oxide may be carried out by any well-known chemical method, for instance at temperatures of about 140° C. and in the presence of traces of boron tri-fluoride-phenol complex. Particularly useful proportions are from about 0.5 to about 1 mole of alkylene oxide per mole of partial ester.

The alkyl chloropropyleneoxy esters employed in the present invention are thought to have the general formula:

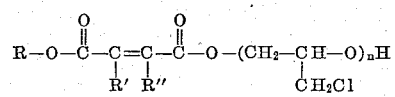

where R is an alkyl group containing from about 8 to about 24 carbon atoms; R' and R'' are constituents selected from the class consisting of hydrogen atoms and methyl groups, at least one such constituent being a hydrogen atom; and $n$ may vary from one to three or more, depending upon the quantity of epichlorohydrin employed in preparing the esters, The long chain saturated aliphatic alcohols reacted with the dibasic acids or acid anhydrides to produce half esters may contain from about 8 to 24 carbon atoms per molecule, those containing from about 8 to about 18 carbon atoms being preferred. Straight chain primary alcohols such as dodecyl, cetyl, eicosyl and docosyl are preferred, but it is permissible to use branched alcohols such as 2-ethylhexanol-1 and $C_8$ oxo-alcohols, secondary alcohols such as capryl alcohol and mixtures of straight and branched-chain alcohols if desired.

Commercially marketed mixtures of alcohols consisting essentially of saturated aliphatic alcohols having the requisite chain length may also be used for preparing either the alkoxy esters or the alkyl chloropropyleneoxy esters of the invention. One such preferred mixture prepared by the hydrogenation of coconut oil is sold under the trade-name "Lorol" and comprises saturated aliphatic alcohols containing from 8 to 18 carbon atoms per molecule. This mixture consists chiefly of lauryl alcohol having 12 carbon atoms per molecule and has the following approximate composition.

| Number of carbon atoms: | Weight percent |
|---|---|
| $C_{10}$ | 4.0 |
| $C_{12}$ | 55.5 |
| $C_{14}$ | 22.5 |
| $C_{16}$ | 14.0 |
| $C_{18}$ | 4.0 |

Lorol is thus a commercial mixture of saturated aliphatic alcohols containing from 10 to 18 carbon atoms per molecule and having an average chain length of 12–14.

The $C_8$ Oxo alcohols referred to above are well known in the art and can be prepared from $C_7$ olefins by reaction with carbon monoxide and hydrogen in the presence of a Group VIII metal catalyst, which is usually cobalt. The reaction products are primarily $C_8$ aldehydes which are then hydrogenated in a separate catalytic stage to convert the aldehydes to the corresponding alcohols. The $C_8$ Oxo alcohols are predominantly branched-chain compounds and consist essentially of a mixture of isomers having the formula:

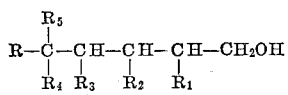

where R stands for methyl or ethyl and $R_1$, $R_2$, $R_3$, $R_4$ and $R_5$ stand for hydrogen or methyl groups, and wherein $R_1$ plus $R_2$ plus $R_3$ plus $R_4$ plus $R_5$ contain up to 2 carbon atoms.

Higher molecular weight Oxo alcohols may also be used in preparing the additives of the invention. These are prepared in the same general manner as the $C_8$ Oxo alcohols starting with higher molecular weight olefins.

The half esters prepared by reacting the dibasic acid and alcohol are in turn reacted with epichlorohydrin in the presence of from about 0.05 to 5.0 percent by weight of an acidic (electron acceptor) catalyst such as boron trifluoride, boron trifluoride etherate, aluminum trichloride, aluminum tribromide or the like or a basic catalyst such as $NaOCH_3$ or NaOH. The reaction is carried out by slowly adding the epichlorohydrin to the half ester mixed with catalyst over approximately a one to two hour period. The temperature at which the addition is carried out may range between about 100° C. and 180° C. The reactants are held at this temperature from about 4 hours to about 24 hours or longer. Depending upon the number of chlorine atoms desired per molecule of mixed ester, the ester:epichlorohydrin ratio may range between about 1:1 to about 1:4. Under these conditions the addition of the epichlorohydrin molecule to the half ester takes place through the epoxy group and the chlorine atom of the epichlorohydrin is unaffected.

It is preferred that the half ester and the epichlorohydrin be reacted in susbtantially equimolar quantities so that the mixed ester contains a single chloropropyleneoxy group. The reaction may be carried out in a suitable solvent such as benzene, toluene, xylene or the like if desired, although ordinarily the use of such a solvent is not necessary. The mixed ester thus produced may be washed with a dilute solution of sodium hydroxide if the catalyst used was acidic or dilute acid if the catalyst was basic and then water washed.

Preferably, to prepare useful additives for lubricating oil and fuel oil compositions, the alkoxy esters or the alkyl chloropropyleneoxy esters are copolymerized with other polymerizable organic monomers containing a vinyl group. Suitable monomers containing vinyl groups include hydrocarbons such as styrene, isobutylene, and butadiene; esters such as allyl acetate, vinyl acetate, vinyl propionate and methyl methacrylate; ethers such as allyl ethyl ether and divinyl ether; nitriles such as acrylonitrile and vinylacetonitrile. Mixtures of such monomers containing vinyl groups with other copolymerizable materials, long chain alcohol esters of unsaturated conjugated dibasic acids such as lauryl maleate and stearyl fumarate, for example, may also be used. Vinyl esters of short chain fatty acids, particularly vinyl acetate, and mixtures of such esters with fumarate or maleate esters of long chain aliphatic alcohols containing from about 8 to about 20 carbon atoms per molecule are preferred monomers for the preparation of copolymers with the esters.

The copolymerization of the ester with the organic monomer may be carried out in a solution of benzene, heptane, white oil, or other suitable organic solvent at a temperature in the range of from about 60° to about 250° F. and may be promoted by gamma radiation or by the use of a peroxide-type catalyst such as benzoyl peroxide, a hydroperoxide or an azo catalyst such as alpha, alpha'-azo-bis-isobutyronitrile. The mole ratio of ester to other organic monomers in the polymerization mixture may be varied from about 2:1 to about 1:20, and is preferably in the range of from about 1:1 to about 1:8. The polymerization may be carried out in a suitable solvent in order to control reaction velocity and molecular weight. Oxygen may be excluded during the polymerization by the use of a blanket of an inert gas such as nitrogen or carbon dioxide. The polymerization time may vary from about 1 to 36 hours.

Polymerization of the ester and the organic monomer proceeds between the unsaturated double bonds in the acid portion of the ester and in the monomer. The copolymer may have molecular weights of from about 3000 to about 100,000 or higher. The molecular weight can be determined by measuring the viscosity of diisobutylene solutions containing 5 mg. of the copolymer per cc. and applying the Staudinger equation. Molecular weights of from about 6,000 to about 30,000 are particularly preferred. Upon completion of the polymerization reaction, the copolymer may be freed of solvent and employed as additive for fuel oil or lubricating oil.

The copolymers of the invention may be added to hydrocarbon oils in the general class of middle distillate fuels and lubricating oils in concentrations of from about 0.002 to about 20 percent. For use as stabilizing agents for middle distillates, i.e., for inhibiting the formation of sludge and sediment in such fuels, concentrations of from about 0.002 to about 2 weight percent may be used. Preferred concentrations in such instances are from about 0.005 to about 0.1 weight percent. Petroleum distillate fuels boiling in the range of from about 300° F. and 900° F. are contemplated. Typical of such fuels are No. 1 and No. 2 fuel oils meeting ASTM Specification D–396–48T; diesel fuels qualifying as Grades 1D, 2D, and 4D of ASTM Specification D–975–51T, and jet engine fuels such as those covered by U.S. Military Specifications MIL-F-5624C.

For use as lubricating oil additives for lowering pour point, improving viscosity index, and increasing detergency, the copolymers of the invention may be added in concentrations of from about 0.01 to about 20 weight percent, preferably from about 0.1 to about 10 weight percent. The oil base stock may be of any desired type, including those derived from paraffinic, naphthenic, asphaltic, or mixed-base mineral crude oils by suitable refining methods. Synthetic hydrocarbon lubricating oils may also be employed.

In either the fuel or lubricant compositions, other conventional additives may also be present, including dyes, antioxidants, antiwear agents, other dispersants, etc.

In accordance with the present invention, prior to the polymerization of the esters of unsaturated dibasic acids of the types described, or of the copolymerization of those esters with other monomers, the esters are treated with ammonia or with ammonia derivatives of the class consisting of alkyl amines, aryl amines and quaternary ammonium hydroxides.

The alkyl amines that may be employed are selected from the group consisting of saturated alkyl monoamines, diamines and triamines having from 1 to 18 carbon atoms in the alkyl groups. The aryl amines are selected from the group containing only one benzene ring. The ammonia derivative chosen should preferably be one whose conjugate salt has a $K_a$ (dissociation constant) that is less than the $K_a$ of the acid groups in the polymers that are treated.

Specific ammonia derivatives that may be employed in practicing the invention include methyl amine, ethyl amine, propyl amine, tetramethyl ammonium hydroxide, dimethyl amine, aniline, dodecyl amine, cetyl amine, tetramethyl ammonium hydroxide, methyl aniline, and tri-coco-methyl ammonium hydroxide.

Treatment with ammonia involves saturation of the monomers with ammonia prior to polymerization. In the case of treatment with amines, or with quaternary ammonium hydroxide, preferably from 10 to 20 percent excess of the amine should be used over the amount theoretically required by calculation from the total acid number (TAN) of the monomer. Treatment temperatures may range from about 40° to about 130° F., preferably about 60° to 110° F. Treating times are not critical, as the reaction takes place within the first few moments of contact, but in using volatile bases saturation is necessary.

The nature of this invention and the manner in which it may be practiced will be more fully appreciated from the following examples.

Example 1

The half ester of maleic acid and a $C_8$ Oxo alcohol mixture was prepared and then reacted with epichlorohydrin in the presence of 0.05 wt. percent of NaOH as a catalyst. One mole of epichlorohydrin was added to one mole of the acid ester in a stirred reaction vessel containing the catalyst over a period of about 3.5 hours at 130° C. At the end of this time, essentially all of the reactants had been converted to isooctyl chloropropyleneoxy maleate. The total acid number (mg. KOH/g.) of the product was found to be 43.1. (Saponification No. was 496 mg. KOH per gram.)

Example 2

A mixture of 14.8% of the product of Example 1 and 85.2% of tallow fumarate (Total Acid Number 0.55) was dissolved in ether, in the proportion of about 2 parts by weight of ether to about 1 part by weight of the esters, and then saturated with with ammonia gas. The solution was then placed on a steam bath and blown with nitrogen to remove excess ammonia. The residue from this step was placed in a vacuum oven at 60° C. for 16 hours. A mixture of monomers was then prepared having the following composition: 1.12 grams vinyl acetate, 7 grams of the ammonia-treated mixture described above, 10 ml. benzene and 0.088 gram of benzoyl peroxide. This mixture provided the monomers in the mole ratio of 1 mole of vinyl acetate to 0.25 mole of $C_8$ oxo chloropropyleneoxy maleate and 0.75 mole of tallow fumarate. A similar mixture was also prepared using the same monomers but without subjecting the maleate-fumarate mixture to ammonia treatment. Still another mixture was prepared in which the maleate-fumarate mixture was treated with 10 weight percent of a 10 percent aqueous solution of tetramethyl ammonium hydroxide. Each of the mixtures was then heated to effect polymerization. The results obtained are shown in Table I.

TABLE I.—COPOLYMERIZATION OF VINYL ACETATE, TALLOW FUMARATE AND $C_8$ OXO CHLOROPROPYLENE-OXY MALEATE

| Monomer Treatment | Heating, Time, Minutes at 86° C. | Gel Formation | Conversion of Monomer to Linear Polymer |
|---|---|---|---|
| $NH^3$ Treated | 185–265 | None (very viscous) | 100%. |
| No $NH^3$ Treat.[1] | 100 | Gel formed | Partial [3]. |
| No $NH^3$ Treat.[2] | 90 | ____do____ | Low [3]. |
| $(CH^3)^4$ NOH Treated | 1,100 | Viscous polymer | 100%. |

[1] Product of Example 1 (TAN value 43.1).
[2] Separate batch prepared as in Example 1, but having lower TAN value of 9.1.
[3] In each of these cases, polymer yield was low and polymer was contaminated with precipitated monomer.

It will be seen from the results obtained that the ammonia treatment enabled the polymerization to proceed to 100% monomer conversion as measured by polarograph and without gel formation.

To get 100 percent conversion of monomers to polymers at 86° C., a heating time of from 185 to 265 minutes is required. Without the ammonia treatment gel formation occurs before 100 percent conversion is attained. The degree of conversion before gel formation appears to be largely independent of the total acid number, as shown by the results with the two different batches of monomer. In other words, so long as the monomer exhibits acidity, gel formation is likely to occur.

The data point up the advantage of this invention, which is that when the monomer is subjected to treatment with ammonia or an ammonia derivative the monomers copolymerize to give a fairly high molecular weight two-dimensional, linear, tractable oil-soluble polymer, and the heating time is not confined within narrow limits, i.e., heating beyond the time for complete conversion of monomers does no particular harm. Without the ammonia treat, gel formation occurs before sufficient polymerization has been attained to give a useful product, i.e., one that would exhibit adequate sludge dispersancy or viscosity index improving properties. In severe cases of cross-linking, the product may be an intractable oil-insoluble solid or semi-solid polymer that may even be difficult to remove from the reaction vessel.

Treatment of the monomers with ammonia or an ammonia derivative prior to polymerization permits the reaction to be carried to completion, i.e., it ensures maximum conversion of monomer to polymer. This is of economic importance not only from the standpoint of yield but also from that of product quality, as it eliminates monomer precipitation. Furthermore, the treating step of the present invention makes commercially feasible those polymerization reactions that would not otherwise be so because of the need for critical control of conditions to prevent gel formation and/or of unpredictability of gel formation tendencies.

Example 3

Tridecyl chloropropyleneoxy maleate was prepared as follows. After 298 grams of tridecyl hydrogen maleate had been heated to 150° C. in the presence of 1.5 ml. of boron trifluoride etherate, 92.5 g. of epichlorohydrin was added with stirring over a period of 0.5 hour. Heating was continued for 24 hours at 140–150° C. with stirring. The product was then dissolved in an equal volume of hexane, washed twice with tap water, and then dried over anhydrous $Na_2SO_4$, after which the hexane was removed by distillation at low pressure. The product had a TAN of 11.4.

*Example 4*

A quantity of the tridecyl chloropropyleneoxy maleate of Example 3 was dissolved in twice its weight of ether and treated with ammonia in the same manner as described in Example 2. One mole of the product and 1.4 moles of vinyl acetate were dissolved in 50% concentration in benzene and heated at 86° C. to effect polymerization. A similar mixture of vinyl acetate and untreated tridecyl chloropropyleneoxy maleate was also heated in the same manner. The results obtained are given in Table II:

TABLE II.—COPOLYMERIZATION OF VINYL ACETATE AND TRIDECYL CHLOROPROPYLENEOXY MALEATE

| Monomer Treatment | Heating Time, 86° C., minutes | Gel Formation | Monomer Conversion to Linear Polymer |
|---|---|---|---|
| NH$_3$ Treated | 60 | None (very viscous). | 100%. |
| No Ammonia Treat | 30 | Gel formed | Essentially nil. |

*Example 5*

One gram molecule of maleic acid is partly esterified with 1.6 gram molecules of a $C_9$ Oxo alcohol, using 1 weight percent of p-toluene sulfonic acid as catalyst. The resulting ester has an acid number of 40 after reaction water has been removed. The ester is condensed over a 16-hour period at 285° F. with sufficient ethylene oxide to combine 8 weight percent with the ester, using traces of a BF$_3$-phenol complex as catalyst. The product has an acid number of 6. It is treated with ammonia gas in the manner of Example 2. It is then copolymerized with 25 weight percent of vinyl acetate at 175° F. in the presence of benzoyl peroxide catalyst. The resulting copolymer is added to a paraffinic lubricating oil in from 2 to 4 weight percent concentration as a viscosity index improver.

*Example 6*

A blend was prepared consisting of a petroleum fuel oil (No. 2 heating oil) to which had been added 0.01 weight percent of the ammonia-treated copolymer of Example 2. This blend was compared with the fuel oil alone, without the additive, in an accelerated filter plugging test, which consisted in aging the samples at a maximum temperature of 230° F., filtering them, and noting the sediment collected. The test is described in detail in "New Fast Test Method for Distillate Storage Stability," by W. A. Konrad, N. L. Shipley, and T. S. Tutwiler, appearing in Petroleum Processing, September 1956, page 145.

The results obtained in the test are given in Table III and show that the additive was very effective in stabilizing the fuel oil against sediment formation.

TABLE III

Fuel tested: Overall demerit
Fuel oil alone _____ 9.8
Fuel oil+0.01% of copolymer from NH$_3$-treated monomer _____ 1.2

The examples herein presented are to be regarded merely as illustrating the principle of the invention and not as limiting it in any manner. Numerous modifications such as will occur to those skilled in the art may be made without departing from the spirit of the invention, whose scope is to be determined from the claims appended hereto.

What is claimed is:

1. In the preparation of an oil-soluble addition polymer by polymerization of a monomer selected from the group consisting of (a) alkoxy esters obtained by reacting a half ester of an ethylenically unsaturated $C_4$ to $C_5$ dicarboxylic acid and a $C_3$ to $C_{20}$ saturated aliphatic alcohol with an alkylene $C_2$ to $C_6$ oxide; and (b) alkyl chloropropyleneoxy esters having the formula $$R-O-\underset{\underset{R'}{|}}{\overset{\overset{O}{\|}}{C}}-C=C-\underset{\underset{R''}{|}}{\overset{\overset{O}{\|}}{C}}-O-(CH_2-\underset{\underset{CH_2Cl}{|}}{C}H-O)_nH$$

where R is an alkyl group containing from about 8 to about 24 carbon atoms; R' and R'' are constituents selected from the group consisting of hydrogen atoms and methyl groups, at least one such constituent being a hydrogen atom; and $n$ is one to about three, said polymerization reaction being a type selected from the group consisting of solution and bulk polymerization and which is catalyzed by a catalyst selected from the group consisting of free radical, radiation and heat; the improvement for preventing cross-linking of said addition polymer which comprises treating said monomer at a temperature in the range of about 40° F. to about 130° F. prior to said polymerization by contacting said monomer with a nitrogen compound selected from the group consisting of ammonia, alkyl amines, aryl amines, and quaternary ammonium hydroxides.

2. The improvement as defined by claim 1 wherein said monomer is copolymerized with an organic polymerizable monomer containing a vinyl group, subsequent to said treatment with said nitrogen compound.

References Cited by the Examiner

UNITED STATES PATENTS

| 2,512,601 | 6/1950 | Bates et al. | 260—78.4 |
| 2,727,862 | 12/1955 | Giammaria | 252—51.5 |
| 2,737,496 | 3/1956 | Catlin | 252—51.5 |
| 2,744,071 | 5/1956 | Hollyday | 252—51.5 |
| 2,852,495 | 9/1958 | Hunsucker | 260—78.4 |
| 2,883,367 | 4/1959 | Dazzi | 260—78.4 |

FOREIGN PATENTS

| 569,574 | 1/1959 | Belgium. |
| 854,658 | 11/1960 | Great Britain. |

JOSEPH L. SCHOFER, *Primary Examiner.*

JULIUS GREENWALD, DONALD E. CZAJA,
*Examiners.*

P. C. BAKER, L. WOLF, *Assistant Examiners.*